United States Patent
Kuwayama et al.

[11] Patent Number: 6,064,633
[45] Date of Patent: May 16, 2000

[54] TRACK JUMPING CONTROLLING METHOD/APPARATUS

[75] Inventors: Yasunori Kuwayama, Daito; Kazuteru Adachi, Dato, both of Japan

[73] Assignee: Funai Electric Co., Ltd., Osaka, Japan

[21] Appl. No.: 09/107,176

[22] Filed: Jun. 29, 1998

[30] Foreign Application Priority Data

Jul. 3, 1997 [JP] Japan .................................. 9-178337

[51] Int. Cl.⁷ .................................................. G11B 17/22
[52] U.S. Cl. ............................................. 369/32; 369/215
[58] Field of Search .............................. 369/32, 215, 33, 369/44.28, 44.27, 44.29, 44.35

[56] References Cited

U.S. PATENT DOCUMENTS

| | | | |
|---|---|---|---|
| 4,835,752 | 5/1989 | Nakatsu et al. | 369/32 |
| 5,604,720 | 2/1997 | Kimura et al. | 369/32 |
| 5,623,464 | 4/1997 | Tani | 369/44.28 |

*Primary Examiner*—Tan Dinh
*Attorney, Agent, or Firm*—Lackenbach Siegel

[57] ABSTRACT

A disc apparatus includes a micro-computer. The micro-computer predicts a number of tracks for deceleration from a total number of tracks to be jumped, to thereby calculate a number of tracks for acceleration from the number of tracks for deceleration and the total number of tracks. A thread motor is accelerated until a number of tracks being jumped becomes equal to the number of tracks for acceleration. Thereafter, the thread motor is decelerated to a rotational speed lower than a determined value.

10 Claims, 4 Drawing Sheets

(a)

(b)

TRACK JUMPING CONTROLLING METHOD/APPARATUS

BACKGROUND OF THE INVENTION

1. Field of the invention

This invention relates to a disc apparatus and thread-moving method therefor, and more particularly to a thread-moving method for causing an optical pickup to access at a high speed to a target position, and disc apparatus utilizing the same.

2. Description of the prior art

In a conventional disc apparatus of this kind, the tracks to be jumped over is calculated in number depending upon a current-position address and a target-position address. Based on the calculated number, a number for acceleration or deceleration is calculated according to a table or calculating equation, thereby accelerating or decelerating a thread motor.

In the prior art, however, the acceleration and deceleration of the thread motor are carried out while monitoring the number of tracks. Accordingly, data reading (track-on) is commenced in a state that the thread (pickup) moving speed has not been decelerated to a sufficiently reduced extent, resulting in a problem of irregularity in tracking.

On the other hand, conventionally a constant level voltage is continuously applied to the thread motor. This might accelerate the pickup unlimitedly, possibly raising a problem of difficulty in controlling the rotation of the thread motor. Thus, there has been a difficulty for pickup to get access to a desired position in a brief period of time.

SUMMARY OF THE INVENTION

Therefore, it is a primary object of this invention to provide a thread-moving method in which seek is possible at high speeds and with accuracy while preventing against irregularity of tracking after effecting a track jump.

It is another object of this invention to provide a disc apparatus which is capable of seeking at high speeds and with accuracy while preventing against tracking irregularity after effecting a track jump.

This invention is directed to a thread moving method, comprising the steps of: accelerating a thread motor for a time period corresponding to a predetermined number of tracks; and thereafter decelerating said thread motor to a speed lower than a predetermined speed.

In this invention, the rotational speed of the thread motor is accelerated by a number of tracks determined by a predictable number of tracks for deceleration, and thereafter decelerated to a rotational speed at which track on can be effected while monitoring the rotational speed of the thread motor. That is, if the thread motor is accelerated depending upon a number of tracks calculated from a predicted number of tracks for deceleration, it is possible to effect a track jump to a position at which track on can be positively effected without monitoring the number of tracks for deceleration. That is, since the rotational speed of the thread motor for deceleration is monitored, track on is possible without incurring irregularity in tracking.

In another aspect of this invention, predicting is made for a number of tracks for deceleration from a total number of tracks to be jumped; determining is made for a number of tracks for acceleration based on the predicted number of tracks for deceleration and the total number of tracks; and accelerating is made for a thread motor by the determined number of tracks for acceleration. In this aspect, a number of tracks for deceleration is predicted from a number of tracks to be jumped. That is, a number of tracks for deceleration, in which a characteristic of the thread motor has been fully taken into consideration, is previously stored in a table or calculated by a calculating equation, to thereby predict a number of tracks for deceleration in accordance with a required total number of tracks. This predicted number of tracks for deceleration is subtracted from the total number of tracks, determining a number of tracks for acceleration. That is, since the number of tracks for deceleration can be predicted, a jump can be effected with accuracy only by monitoring the number of tracks for acceleration.

Incidentally, an error in an actual track jump may be calculated in order to correct the number of tracks for deceleration depending upon the error in the jump. To correct the number of tracks for deceleration, an alteration may be made for the table or calculating equation.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
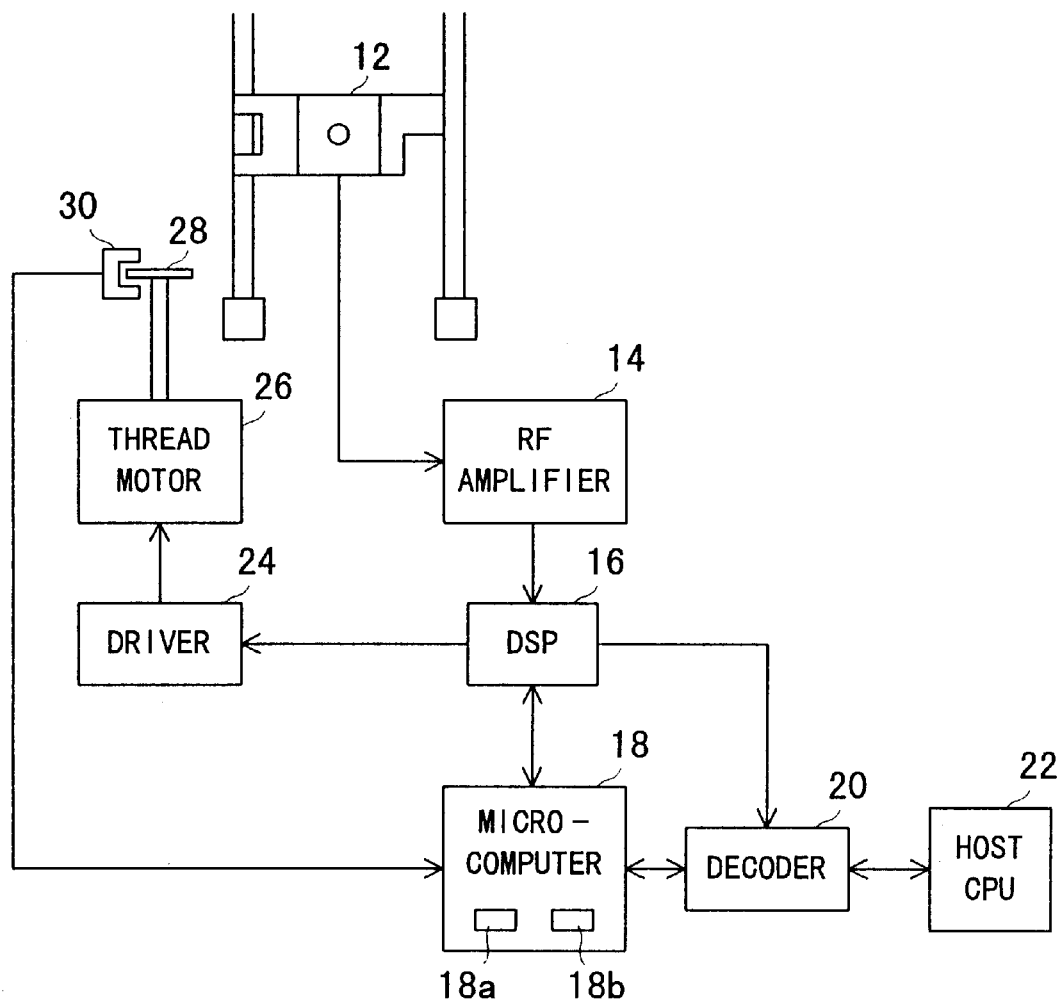
FIG. 1 is a block diagram showing one embodiment of this invention.

Referring to FIG. 1, a disc apparatus 10 in this embodiment includes an optical pickup 12. The optical pickup 12 reads out a reproduced signal and a tracking signal which are supplied to an RF amplifier 14. The RF amplifier 14 amplifies the reproduced signal and tracking error signal thus read, and supplies amplified signals to a DSP 16. The DSP 16 extracts a sub-code out of the reproduced signal, so that disc information such as time information contained in the sub-code is given to a micro-computer 18. On the other hand, the tracking-error signal after amplification is supplied through the DSP 16 to the micro-computer 18. The micro-computer 18 servo-controls the pickup 12 depending on the disc information and the tracking-error signal. Also, the micro-computer 18 detects a number of jumped-over tracks from the tracking-error signal. The detected number of tracks is counted by a counter 18a provided within the micro-computer 18.

The micro-computer 18 is connected through a decoder 20 to a host CPU 22, wherein an interface cable is utilized in connection of between them. This enables transmission and reception of data between the micro-computer 18 and the host CPU 22. The decoder 20 demodulates the reproduced signal given from the DSP 16, and the demodulated signal is supplied to the host CPU 22. The host CPU 22 supplies control data, for designating such a mode as reproduce, stop, FF (Fast Forward), FR(Fast Reverse), seek and so on, to the micro-computer 18 through the decoder 20. That is, the micro-computer 18 performs thread-control on the pickup 12 according to the control data supplied from the host CPU 22. More specifically, the DSP 16 generates a jump pulse to drive a thread motor 26 according to a command from the micro-computer 18. The jump pulse is supplied to a driver 24. The driver 24 creates a voltage to drive the thread motor 26 depending upon the jump pulse. The drive to the thread motor 26 causes the pickup 12 that is coupled through a rack-and-pinion mechanism (not shown) to be moved in a thread direction.

Figure 2:
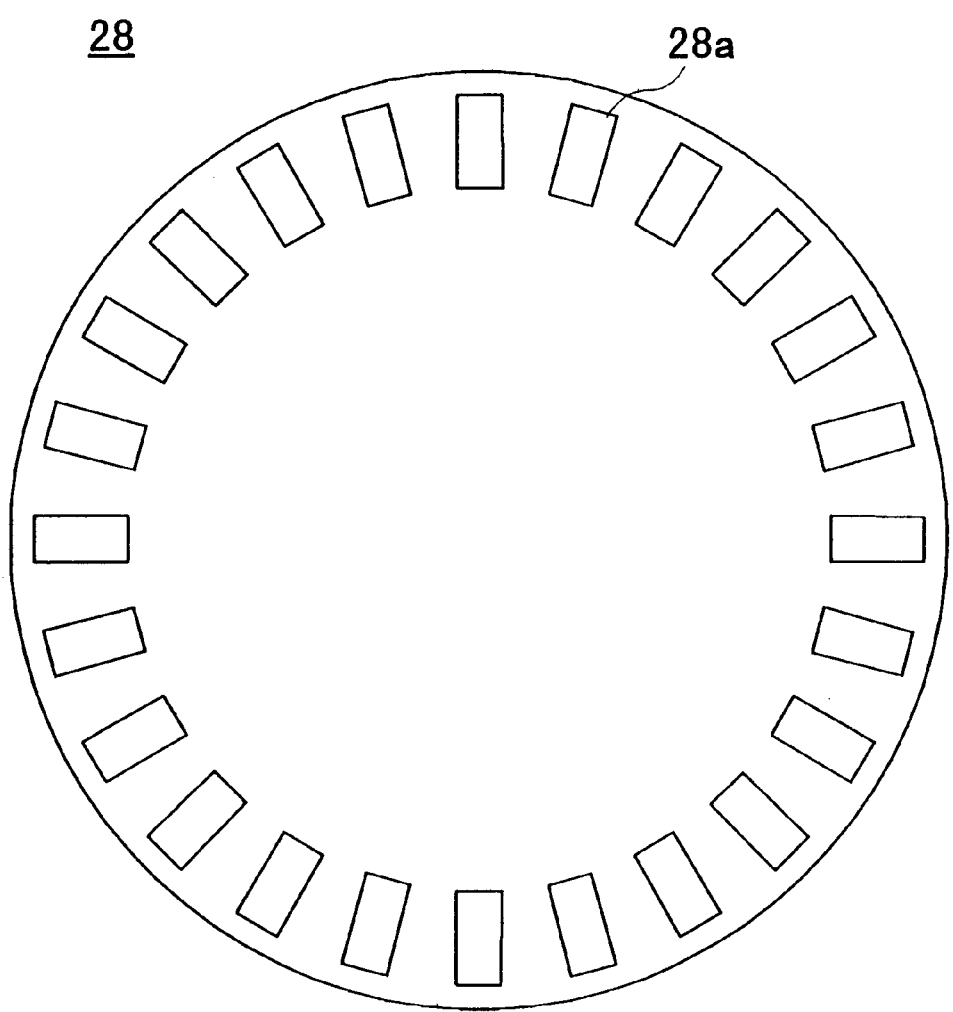
FIG. 2 is an illustrative view showing a light-shielding plate employed in the FIG. 1 embodiment.

The thread motor 26 has a light-shielding plate 28 provided at a tip of a motor shaft thereof. The light-shielding plate 28 is generally in a disc shape, as shown in FIG. 2. The light-shielding plate 28 has a plurality of slits 28a arranged at an equal interval in an outer periphery thereof. Incidentally, the light-shielding plate 28 rotates about an axis of a motor shaft of the thread motor 26.

In the vicinity of the light-shielding plate 28, there is provided a sensor 30. This sensor 30 has a light emitting portion from which an infrared light is emitted to detect a slit 28a of the light-shielding plate 28, and a light receiving portion arranged opposite to the light emitting portion to receive the emitted infrared light. That is, the sensor 30 is arranged such that the light-shielding plate 28 passes at an outer periphery through between the light emitting and receiving portions. The presence of a slit 28a is detected when the light receiving portion receives infrared light emitted from the light emitting portion. The sensor 30, when detecting a slit 28a, supplies a detection pulse to the micro-computer 18. The micro-computer 18 detects a rotational speed of the thread motor 26, i.e. a moving speed of the pickup 12, depending on the detection pulse.

Figure 3:
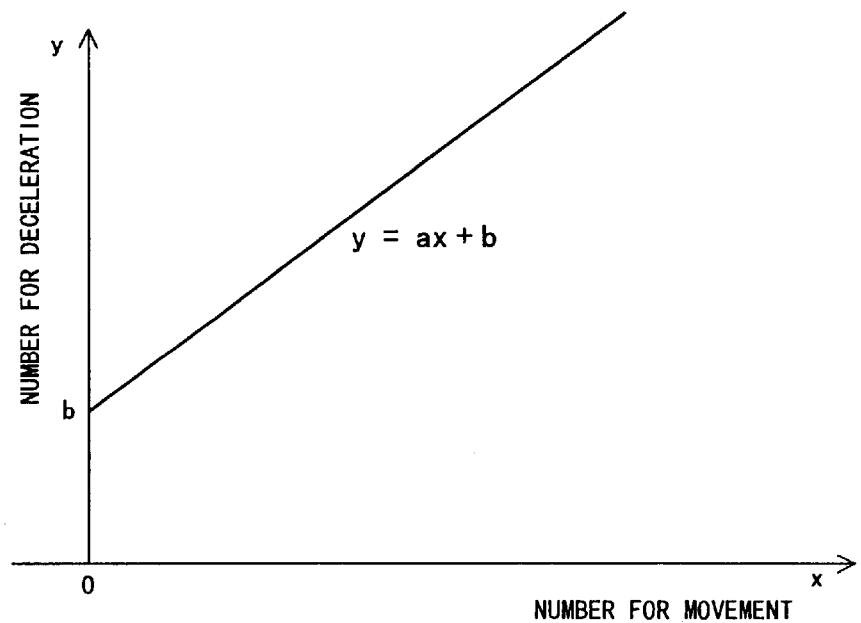
FIG. 3(A) is a graph demonstrating in formulaic representation a number of deceleration against a number of movement of a pickup shown in the FIG. 1 embodiment.
FIG. 3(B) is a graph showing in tabular representation a number of deceleration against a number of movement of the pickup shown in the FIG. 1 embodiment.
Figure 3:
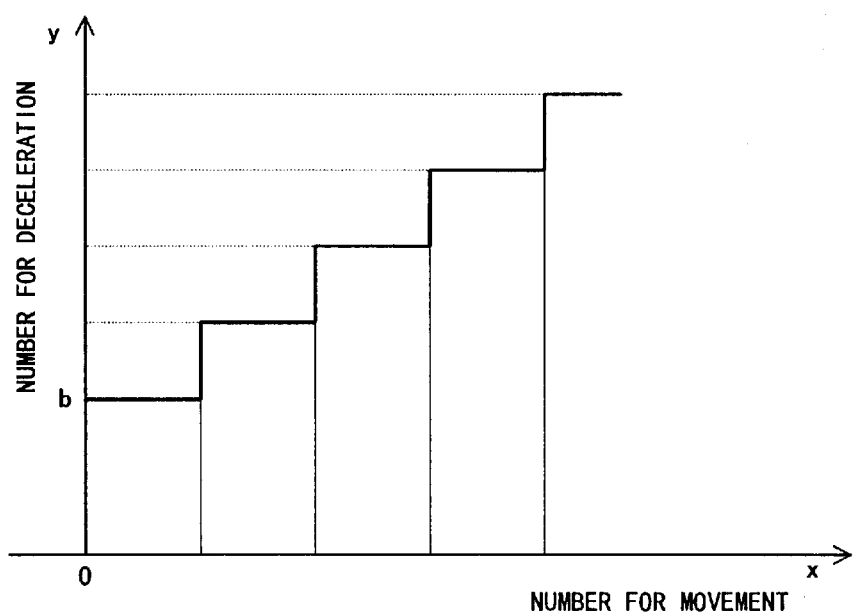

In the disc apparatus 10 constructed as above, when a seek instruction is given from the host CPU 22, the micro-computer 18 calculates a jumping distance based on a current position address and a target position address. The micro-computer 18 then calculates a total number of tracks to be jumped over by using a result of that calculation and a track pitch (1.6 μm). After calculating the total number of jumping tracks, a number of tracks for deceleration (y) is determined from a graph shown in FIG. 3(a), depending upon the number of jumping tracks (x). A number of tracks for acceleration is calculated based on the total number of tracks (the number of tracks for moving) and the number of tracks for deceleration. Incidentally, the number of tracks for deceleration (y) is represented by a linear function (y=ax+b) as shown in FIG. 3, because the thread motor 26 is accelerated with increase in voltage applied thereto.

After computing a number of tracks for acceleration, the micro-computer 18 instructs the number of tracks for acceleration to the DSP 16. The DSP 16, in turn, generates a jumping pulse corresponding to the number of tracks for acceleration. The driver 24 drives the thread motor 26 in accordance with the jump pulse. When a track jump is started, the micro-computer 18 detects a tracking error signal supplied from the pickup 12, and counts a number of tracks having been jumped over during acceleration of the thread motor 26 based on the tracking error signal. When the number of tracks jumped over becomes equal to the calculated number of tracks for acceleration, the micro-computer 18 instructs deceleration to the DSP 16. The DSP 16, in turn, generates a jump pulse to decelerate the thread motor 26 according to the instruction from the micro-computer 18.

When the thread motor 26 starts decelerating, the micro-computer 18 monitors the rotational speed of the thread motor 26 based on a detection pulse of the slits 28a supplied from the sensor 30, and determines whether or not it is possible for the pickup 12 to effect track-on. Incidentally, in this embodiment, when the time interval of detection between one slit 28a and an adjacent slit 18a becomes 10 msec or greater, the micro-computer 18 determines that the pickup 12 can successfully perform track-on. It is therefore possible to positively acknowledge a current position after jumping. Therefore, an error in a track jump can be calculated based on a current position address after jumping and a target position address.

That is, an error in a track jump distance is calculated by a distance from a center of the disc to a current position after jumping as well as a distance from the disc center to a target position. Using a calculated distance and a track pitch (1.6 μm), a number of tracks corresponding to the error is calculated. By using this number of tracks, rewriting is made for the equation (y=ax+b) that represents a number of tracks for deceleration relative to a number of tracks for movement. For example, it is assumed that, when a number of tracks for movement is 1000 and a number of tracks for deceleration is 200, the pickup 12 having track-jumped is at a location 10 tracks beyond that of a number of tracks for movement. In this case, a straight line of a linear function (y=a'x+b) is newly formed by taking a number of tracks for deceleration as 210 with respect to the number 1000 of tracks for movement and connecting between a relevant point and an intercept b on the graph. The linear function is then corrected in inclination of line to an average of an inclination "a" and a new linear-function inclination "a'", i.e. (a+a')/2. A memory 18b is rewritten by this corrected value.

From now on, when data is read out of the same disc, the value (equation representing the number of tracks for deceleration) stored in the memory 18b is used to calculate a number of tracks for acceleration, thereby effecting a track jump. By repeating this operation for each track jump, adjustment (learning) is made to an appropriate line inclination. Incidentally, when the disc is exchanged, initialization is made on the inclination value for the disc so far mounte.

Figure 4:
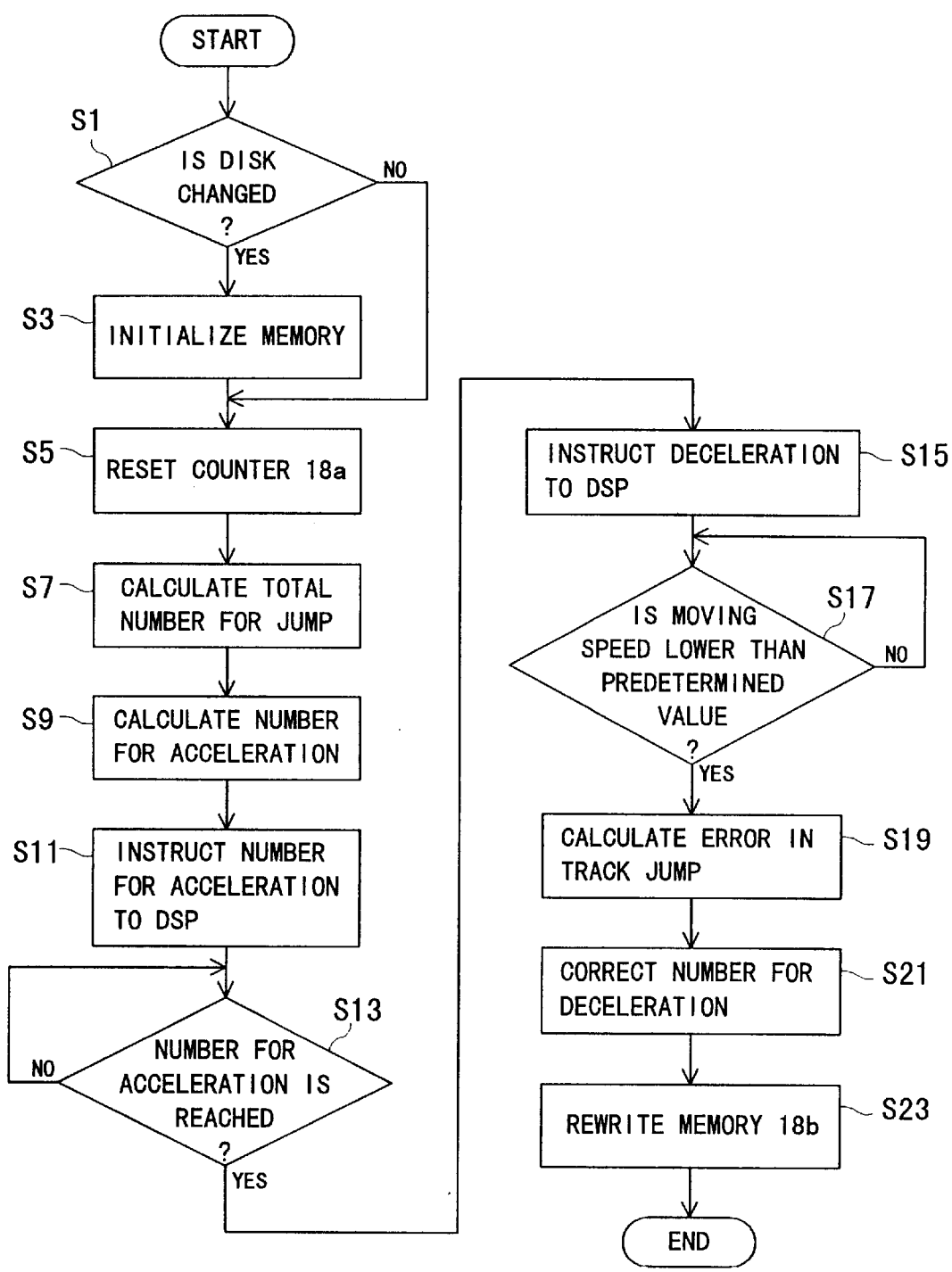
FIG. 4 is a flowchart showing part of processing in the FIG. 1 embodiment.

The micro-computer 18 executes the above operation according to a flowchart shown in FIG. 4. That is, when an instruction of seek is given from host CPU 22, it is determined at a step S1 whether the disc is changed or not. If "YES" at the step S1, initialization is made on the data within the memory 18b, i.e. the inclination value of the equation representing a number of tracks for deceleration at a step S3, and the process proceeds to a step S5. On the other hand, if "NO" at the step S1, the process proceeds directly to a step S5. At a step S5, the count value of the counter 18a is reset, and at a next step S7 a total number of tracks to be jumped over is calculated. At a step S9, a number of tracks for acceleration is calculated based on the total number of tracks to be jumped over and the number of tracks for deceleration corresponding to the total number of tracks to be jumped.

At a step S11, the number of tracks for acceleration calculated at the step S9 is instructed to the DSP 16. At a step S13 it is determined whether a number of tracks being jumped reaches the number of tracks for acceleration or not. If "NO" at the step S13, the process returns to the step S13, while if "YES", deceleration is instructed to the DSP 16 at a step S15. It is determined at a step S17 whether the moving speed of the pickup 12, i.e. the rotational speed of the thread motor 26, becomes lower than a predetermined value or not. If "NO" at the step S17, the process returns to the step S17, while if "YES", an error of the track jump is calculated based on a target positional address and current positional address at a succeeding step S19. At a succeeding step S21 the inclination of the equation representing the number of tracks for deceleration is corrected based on the error. At a step S23, the memory 18b is rewritten by the corrected inclination (a+a')/2, ending the process.

According to this embodiment, acceleration is made by a number of tracks for acceleration calculated based on a number of tracks for movement and a number of tracks for deceleration depending upon the number of tracks for movement, while deceleration is made until the thread-moving speed becomes lower than a predetermined value. This makes it possible to perform seek at high speed and with accuracy. Further, since the number of tracks for deceleration is corrected based on an error occurring in the track jump, accurate track jumps can be effected where the track pitch of a disc is not at 1.6 $\mu$m.

Incidentally, although in this embodiment the number of tracks for deceleration with respect to the number of tracks for movement was expressed by an equation, the number of tracks for deceleration with respect to the number of tracks for movement may be represented by means of a table as shown in FIG. 3(B). In such a case, the table is adjusted in level by learning.

Also, although in this embodiment the inclination (a) of equation (y=ax+b) is corrected, the correction may be by parallel-moving the equation, that is, an intercept (b) of the equation line may be corrected. In this case, a number of tracks corresponding to the error is added to or subtracted from a number of tracks for deceleration on the graph, and then the equation is parallel-moved to a position passing through the relevant point. An intercept value is corrected to (b+b')/2 using the intercept b' after movement and the intercept b before movement.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A thread moving method embodying an optical pickup-sensor and micro-computer circuitry, comprising the steps of:
    (a) accelerating a thread motor for a time period corresponding to a predetermined number of tracks;
    (b) decelerating said thread motor to a speed lower than a rotational speed of said thread motor monitored by the micro-computer to determine whether or not the optical pick-up is able to track-on; and wherein the step(a) includes a step of (a1) determining the predetermined number of tracks by a predictable number of tracks for deceleration, whereby with monitoring rotational speed of deceleration of said thread motor, track-on is enabled without incurring tracking irregularity.

2. A method according to claim 1, wherein the step (a1) includes steps of (a2) determining an error in a track jump, and (a3) correcting the number of tracks for deceleration depending upon the error.

3. A disc apparatus embodying an optical pickup-sensor and micro-computer circuitry, comprising:
    a thread motor for moving the optical pickup;
    an accelerating means for accelerating said thread motor for a time period corresponding to a predetermined number of tracks;
    a decelerating means for decelerating said thread motor to a speed lower than a rotational speed of said thread motor monitored by the micro-computer to determine whether or not the optical pickup is able to track-on; and further comprising a determining means for determining the predetermined number of tracks by a predictable number of tracks for deceleration, wherein said accelerating means accelerates said thread motor depending upon the predetermined number of tracks determined by said determining means, whereby with monitoring rotational speed of deceleration of said thread motor, track-on is enabled without incurring tracking irregularity.

4. A disc apparatus according to claim 3, further comprising a correcting means for correcting the number of tracks for correcting the number of tracks for deceleration that is predictable by said determining means.

5. A disc apparatus according to claim 4, wherein said correcting means includes an error calculating means for calculating an error in a track jump, and the number of tracks for deceleration being corrected depending upon the error.

6. A thread moving method embodying an optical pickup-sensor and micro-computer circuitry, comprising the steps of:
    (a) predicting a number of tracks for deceleration from a total number of tracks to be jumped with the micro-computer calculating jumping distance based on current position address and target position address, and number of tracks to be jumped over based on results of said calculation and track pitch;
    (b) determining a number of tracks for acceleration based on the predicted number of tracks for deceleration and the total number of tracks; and
    (c) accelerating a thread motor by the determined number of tracks for acceleration.

7. A method according to claim 6, further comprising (d) determining an error in a track jump, and (e) correcting the number of tracks for deceleration depending upon the error.

8. A disc apparatus embodying an optical pickup-sensor and micro-computer circuitry, comprising:
    a thread motor for moving the optical pickup;
    a predicting means for predicting a number of tracks for deceleration from a total number of tracks to be jumped, with the micro-computer calculating jumping distance based on current position address and target position address, and number of tracks to be jumped over based on results of said calculation and track pitch;
    a determining means for determining a number of tracks for acceleration based on the predicted number of tracks for deceleration and the total number of tracks; and
    an accelerating means for accelerating said thread motor by the number of tracks for acceleration determined by said determining means.

9. A disc apparatus according to claim 8, further comprising a correcting means for correcting the number of tracks for deceleration that is predictable by said predicting means.

10. A disc apparatus according to claim 9, wherein said correcting means includes an error calculating means for calculating an error in a track jump, and the number of tracks for deceleration being corrected depending upon the error.

* * * * *